United States Patent [19]

Davis

[11] Patent Number: 5,051,773

[45] Date of Patent: Sep. 24, 1991

[54] METHOD AND APPARATUS FOR STORING INFORMATION ABOUT IMAGES

[76] Inventor: Harold H. Davis, 128 N. Craig St., Pittsburgh, Pa. 15213

[21] Appl. No.: 384,634

[22] Filed: Jul. 24, 1989

[51] Int. Cl.[5] .............................................. G03B 27/52

[52] U.S. Cl. ......................................... 355/40; 355/41

[58] Field of Search .................................... 355/40, 41

[56] References Cited

U.S. PATENT DOCUMENTS

| | | | |
|---|---|---|---|
| 3,516,741 | 6/1970 | Thaddey | 355/41 |
| 4,629,312 | 12/1986 | Pearce et al. | 355/41 |
| 4,823,163 | 4/1989 | Rollet et al. | 355/39 |

*Primary Examiner*—Monroe H. Hayes

*Attorney, Agent, or Firm*—Ansel M. Schwartz

[57] ABSTRACT

An apparatus for storing information about images comprised of a sheet of material having a first side and a second side. The sheet retains a plurality of images formed from waves on the first side of the sheet. The apparatus is also comprised of a device for placing information about the images on the second side of the sheet such that the location of information placed on the second side of the sheet corresponds to the location of the image on the first side of the sheet which the information is about. Preferably, the material is photographic paper. A method for storing information about images comprised of the steps of creating a plurality of images from waves on a first side of a sheet of materials which retains such images; and defining locations to place information about the images on a second side of the sheet such that location of information placed on the second side of the sheet corresponds to the location of the image on the first side of the sheet.

9 Claims, 4 Drawing Sheets

METHOD AND APPARATUS FOR STORING INFORMATION ABOUT IMAGES

FIELD OF THE INVENTION

The present invention is related to providing information about images. More specifically, the present invention is related to placing information about images on a first side of a sheet of material and information about the images at a corresponding location on a second side of the sheet.

BACKGROUND OF THE INVENTION

Photographers, after they expose their roll of film, create contact prints to identify which individual prints are desired to be individually developed on the larger photographic.

Photographers typically identify information associated with each image, directly on the image, or on another piece of paper to identify which image the information is associated. The present invention is a simple and easy way to provide information about an image which does not interfere with the image or is not a permanent part of the image.

The present invention provides a photographer with the ability to place information about an image without interfering with the image but which becomes an integral part of the image.

SUMMARY OF THE INVENTION

The present invention pertains to an apparatus for storing information about images. The apparatus is comprised of a sheet of material having a first side and a second side. The sheet retains a plurality of images formed from waves on the first side of the sheet. The apparatus is also comprised of means for placing information about the images on the second side of the sheet such that the location of information placed on the second side of the sheet corresponds to the location of the image on the first side of the sheet which the information is about. Preferably, the material is photographic paper.

The present invention pertains to a method for storing information about images. The method is comprised of the steps of creating a plurality of images from waves on a first side of a sheet of materials which retains such images; and defining locations to place information about the images on a second side of the sheet such that location of information placed on the second side of the sheet corresponds to the location of the image on the first side of the sheet.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
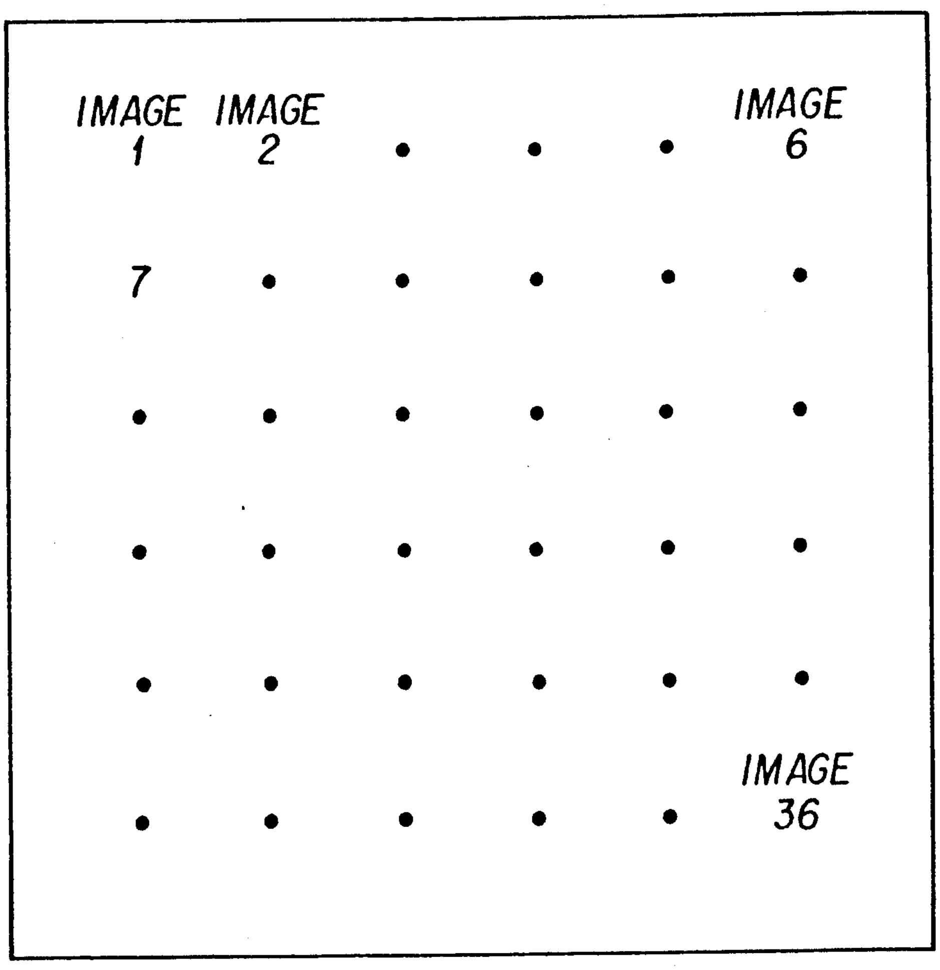
FIG. 1 is a front view of a first embodiment of the invention.
Figure 2:
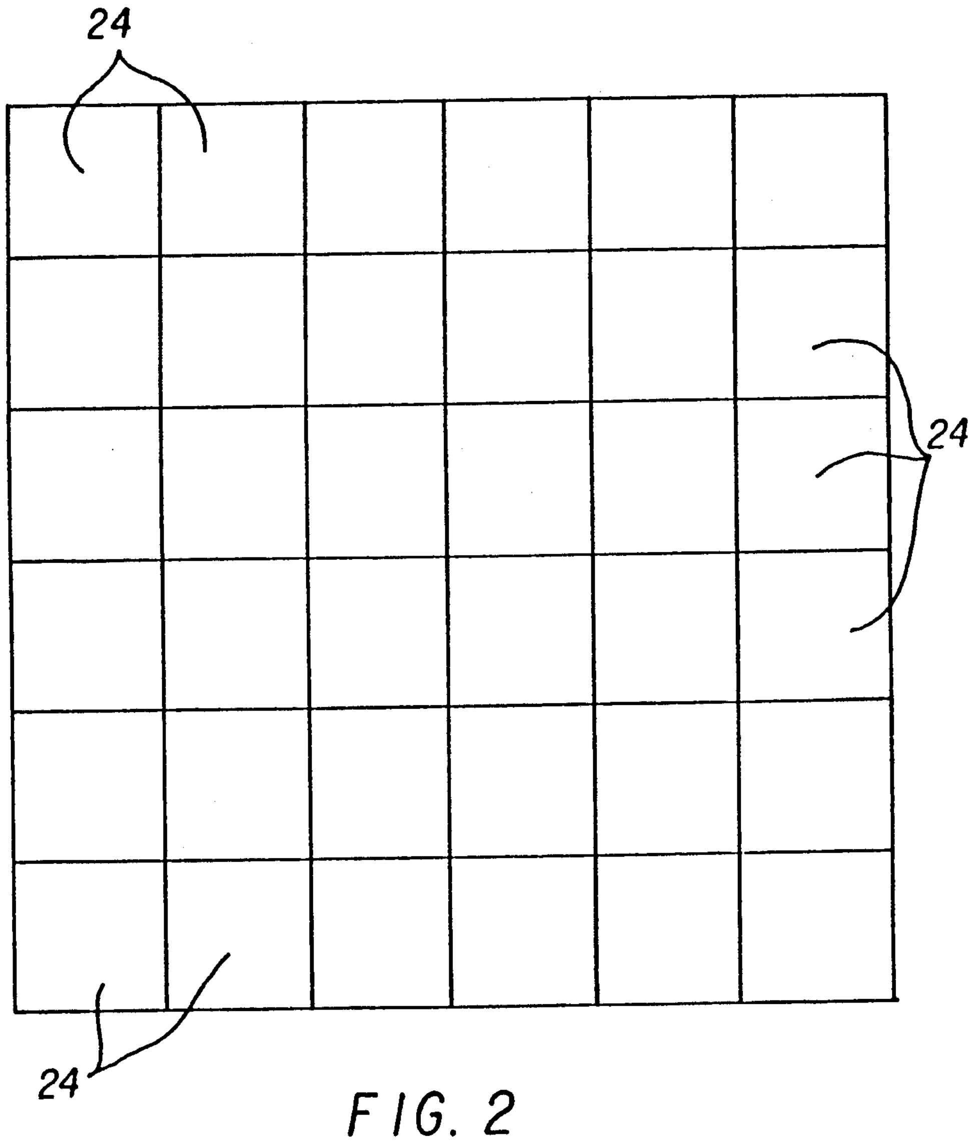
FIG. 2 is a back view of the first embodiment of the invention.
Figure 3:
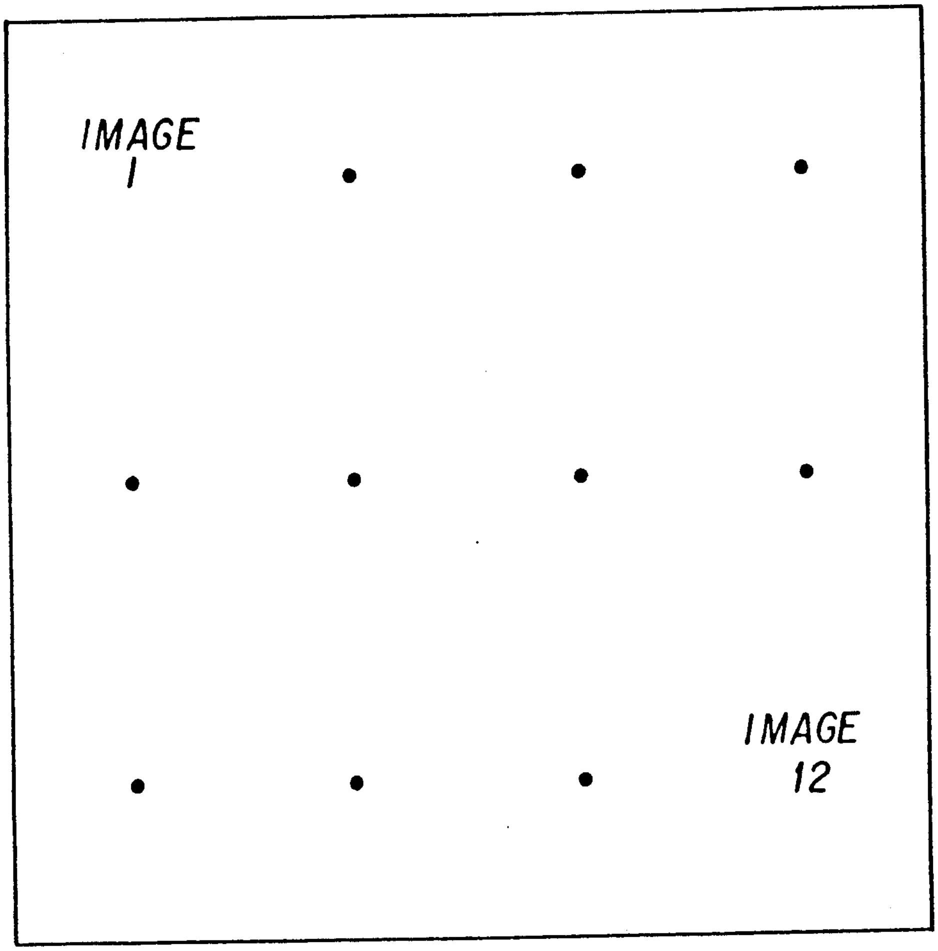
FIG. 3 is a front view of the second embodiment of the invention.
Figure 4:
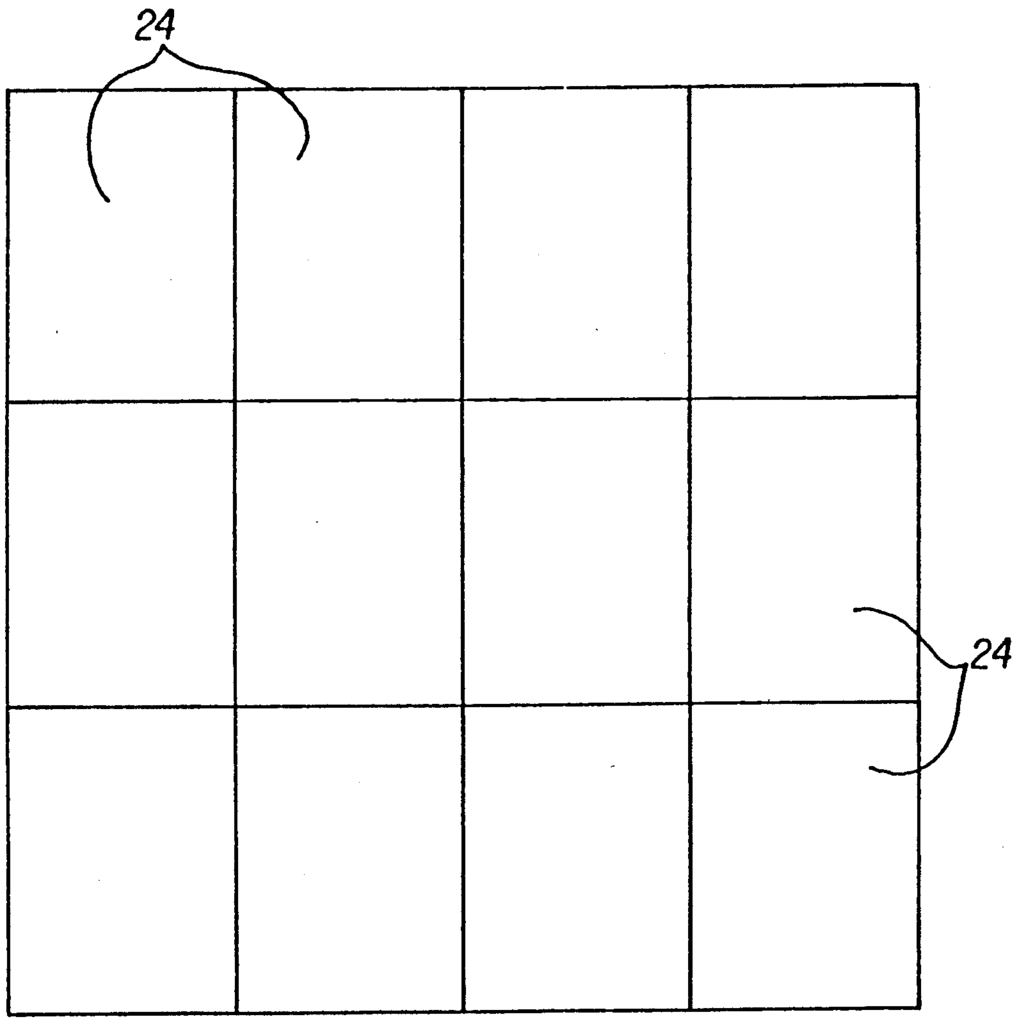
FIG. 4 is a rear view of the second embodiment of the invention.

Referring now to the drawings wherein like reference numerals refer to similar or identical parts throughout the several views, and more specifically to FIG. 1 thereof, there is shown a perspective view of an apparatus 10 for storing information about images 12. The apparatus 10 comprises a sheet 14 of material having a first side 16 and a second side 18. The sheet 14 retains a plurality of images 12 formed from waves on the first side 16 of the sheet 14. The apparatus 10 also is comprised of means 20 for placing information 11 about the images 12 on the second side 18 of the sheet 14 such that the location of image information 11 placed on the second side 18 of the sheet 14 corresponds to the location of the image 11 on the first side 16 of the sheet 14 which the information 11 is about.

Preferably, the material is photographic paper and the placing means 20 includes a grid pattern 22 disposed on the second side 18 of the photographic sheet 14. The grid pattern 22 preferably forms at least as many discrete areas 24 on the second side 18 as there are images 11 on the first side 16 such that information 11 about each image 12 on the first side 16 can appear in the discrete area 24 on the second side 18 that corresponds with it. For instance, for 35 millimeter film there can be thirty-six discrete areas 24 in the grid pattern 22 or for $2\frac{1}{4}+2\frac{1}{4}$ film, the grid pattern 22 can form twelve discrete areas 24.

The present invention pertains to a method for storing information 11 about images 12 comprising the steps of creating a plurality of images 12 from waves on a first side 16 of a sheet 14 of material which retains such images 12; and defining locations to place information 11 about the images 12 on a second side 18 of the sheet 14 such that the locations of information 11 placed on the second side 18 of the sheet 14 corresponds to the location of the image 12 on the first side 16 of the sheet 14.

Preferably, the defining step includes the step of establishing a grid pattern 22 on the second side 18 of the sheet 14. The establishing step preferably includes the step of forming a grid pattern 22 with at least as many discrete areas 24 on the second side 18 as there are images 12 on the first side 16 such that information 11 about each image 12 on the first side 16 can appear on the discrete area 24 on the second side 18 that corresponds with it.

The grid pattern 22 forms, for instance, thirty-six discrete areas when 35 millimeter film is used or twelve discrete areas 24 when $2\frac{1}{4}\times2\frac{1}{4}$ film is used.

Preferably, the material the sheet 14 is made out of is photographic paper and the creating step includes the steps of placing the photographic paper under an enlarger; situating negatives on the first side 16 of the photographic paper; turning on the enlarger to expose the photographic paper with the images 12 of the negatives; developing the photographic paper so the images 12 appears; and writing information 11 about the images 12 on discrete areas 24 formed by the grid pattern 22 on the second side 18 of the photographic paper such that information 11 is written in the discrete area 24 which corresponds to the location of the image 12 on the first side 16.

In the operation of the invention, photographic paper is placed before an enlarger in a dark room with its safe light on. Negatives from a roll of 35 millimeter film are placed next to each other on the first side of the photographic film which is under the enlarger. The enlarger is turned on for a predetermined time and the photographic paper is exposed such that contact prints are made on the photographic paper. The photographic paper is then developed. On the second side 18 of the photographic paper wherein the grid pattern 22 is disposed with thirty-six discrete areas 24 information such as the F stop, the filter, and the amount of seconds that exposure lasts is provided. The information is placed on the discrete area 24 in the grid 22 that corresponds with the image 12 the information 11 is about.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for storing information about photographic images comprising:

a sheet of photographic paper having a first side and a second side, said sheet retaining a plurality of photographic images on the first side of the sheet; and a grid pattern disposed on the second side of the sheet for placing information about the images on the second side of the sheet such that the location of information placed in the grid pattern on the second side of the sheet corresponds to the location of the image on the first side of the sheet which the information is about.

2. An apparatus as described in claim 1 wherein the grid pattern forms at least as many discrete areas on the second side as there are images on the first side such that information about each image on the first side can appear in the discrete area on the second side that corresponds with it.

3. An apparatus as described in claim 1 wherein the grid pattern forms 36 discrete areas.

4. An apparatus as described in claim 1 wherein the grid pattern forms 12 discrete areas.

5. A method for storing information about photographic images comprising the steps of:

creating a plurality of photographic images on a first side of a sheet of photographic paper which retains such images; and defining locations to place photographic paper information about the images on locations of a grid pattern on a a second side of the sheet such that the locations of information placed on the second side of the sheet in the grid pattern corresponds to the location of the images on the first side of the sheet.

6. A method as described in claim 5 wherein the grid pattern has at least as many discrete areas on the second side as there are images on the first side such that information about each image on the first side can appear in the discrete area on the second side that corresponds with it.

7. A method as described in claim 6 wherein the grid pattern formed has 36 discrete areas.

8. A method as described in claim 7 wherein the grid pattern has 12 discrete areas.

9. A method as described in claim 6 wherein the material is photographic paper and the creating step includes the steps of placing the photographic paper under an enlarger, situating negatives on the first side of the photographic paper;

turning on the enlarger to expose the photographic paper with the images of the negatives; developing the photographic paper so the images appear; and writing information about the images on discrete areas formed by the grid pattern on the second side of the photographic paper such that information is written in the discrete area which corresponds to the location of the image on the first side.

* * * * *